US005745311A

United States Patent [19]
Fukuoka et al.

[11] Patent Number: 5,745,311
[45] Date of Patent: Apr. 28, 1998

[54] OPTICAL COMPONENT WELDING APPARATUS

[75] Inventors: Satoshi Fukuoka; Motohiro Yamane; Shizuka Yamaguchi, all of Tokyo, Japan

[73] Assignee: The Furukawa Electric Co., Ltd., Tokyo, Japan

[21] Appl. No.: 699,473

[22] Filed: Aug. 19, 1996

Related U.S. Application Data

[63] Continuation of Ser. No. 357,726, Dec. 16, 1994, abandoned.

[30] Foreign Application Priority Data

Jan. 28, 1994 [JP] Japan .................... 6-008163

[51] Int. Cl.$^6$ .................... G02B 6/255; B23K 26/00; B23K 26/02
[52] U.S. Cl. .................... 359/896; 219/121.6; 219/121.63; 219/121.82; 385/95; 385/98
[58] Field of Search .................... 359/896; 219/121.6, 219/121.63, 121.82, 121.83; 385/96, 98, 97

[56] References Cited

U.S. PATENT DOCUMENTS

| | | | |
|---|---|---|---|
| 3,626,140 | 12/1971 | Peyrot | 219/121 |
| 4,626,651 | 12/1986 | Taniguchi et al. | 219/121 |
| 4,971,418 | 11/1990 | Dorsey et al. | |
| 5,367,140 | 11/1994 | Jonaneh et al. | 219/121.64 |

FOREIGN PATENT DOCUMENTS 2052786   1/1981   United Kingdom .

Primary Examiner—Paul M. Dzierzynski
Assistant Examiner—Audrey Chang
Attorney, Agent, or Firm—Frishauf, Holtz, Goodman, Langer & Chick

[57] ABSTRACT

An optical component welding apparatus for welding together first and second optical components each having an optical axis and a contact surface. The apparatus includes an X—Y stage for fixing the first optical component and aligning the optical axis of the first optical component in an X-axis and Y-axis direction. A fixing disk has a plurality of apertures extending radially and intersecting one another at a center of the fixing disk with respect to the radial direction, and includes a clamp for fixing the second optical component in the center of the fixing disk with respect to the axial and radial directions thereof such that the contact surface of the second optical component faces the contact surface of the first optical component. A holding member has a plurality of apertures each formed in a position respectively corresponding to a position of one of the plurality of apertures of the fixing disk, and the holding member releasably holds the fixing disk and is adapted to carry the fixing disk for axial movement thereof in a Z-axis direction. A Z stage for moving the holding member in the Z-axis direction is provided for fitting the respective contact surfaces of the first and second optical components to each other, and laser emitting heads emit a laser beam through corresponding apertures of the fixing disk and holding member to weld the first and second optical components together at the respective fitted contact surfaces thereof, with the optical axes of the first and second optical components in alignment with each other.

12 Claims, 3 Drawing Sheets

OPTICAL COMPONENT WELDING APPARATUS

This application is a continuation of application Ser. No. 08/357,726, filed Dec. 16, 1994, now abandoned.

BACKGROUND OF THE INVENTION

1. Field of the Invention

The present invention relates to an optical component welding apparatus.

2. Description of the Related Art

In assembling an optical module which incorporates optical components, such as semiconductor lasers, lenses, optical fibers, etc., a welding apparatus is used which fits the respective contact surfaces of two optical components to each other without a gap, thereby aligning the optical axes of the components, and fixes the components by laser welding or the like.

The welding apparatus of this type comprises a fixing disk for fixing a first optical component, a holding ring for liftably carrying and fastening the fixing disk thereon, an up-and-down stage for lifting the holding ring, an X—Y stage carrying a second optical component thereon and capable of moving it in the horizontal direction with respect to the first optical component, thereby aligning the respective optical axes of the components, and a plurality of YAG laser heads.

The fixing disk has a spherical outer peripheral surface, and fixes the first optical component by means of holding claws which protrude from its lower part. The spherical outer peripheral surface is fastened by means of the holding ring.

After the second optical component is set on the X—Y stage, in the welding apparatus constructed in this manner, the fixing disk, with the first optical component fixed thereon by means of the holding claws, is placed on the holding ring so that the respective contact surfaces of the first and second optical components face each other.

Then, the holding ring is lowered by means of the up-and-down stage, whereby the respective contact surfaces of the first and second optical components are brought into contact with each other.

Subsequently, the contact surfaces of the two optical components are fitted to each other with the fixing disk lifted above the holding ring, and the fixing disk is fastened by means of the holding ring.

Thereafter, the up-and-down stage is operated to raise the holding ring, whereupon a narrow gap is formed between the respective contact surfaces of the optical components. Then, the optical axis of the second optical component is aligned with that of the second optical component by means of the X—Y stage.

Visual observation by means of a monitor camera or optical power monitoring is effected in aligning the optical axes.

After the optical axis alignment is finished, the up-and-down stage is operated again to lower the holding ring, thereby causing the contact surfaces to abut against each other. Then, laser beams are emitted individually from the YAG laser heads, whereby the two optical components are welded together on their butted contact surfaces.

In the welding apparatus described above, that portion of the fixing disk which is fixed by means of the holding ring and the position in which the contact surfaces of the two optical components are fitted are biased in the lifting direction of the up-and-down stage. In this apparatus, therefore, the working surface of the fixing disk on which the fastening force of the holding ring acts and the contact surfaces of the optical components are not in alignment, and there are problems as follows.

First, the holding ring is twisted when the fixing disk is fixed by means of the holding ring. If the holding ring is twisted, the fixing disk is twisted as it is fixed to the holding ring, so that misalignment between the respective contact surfaces of the two optical components is too great to fit the surfaces to each other without a gap. Accordingly, the yield of the resulting optical module is not satisfactory. Depending on the the variability of the machining accuracy of the optical components and the conditions in which the components are attached to the welding apparatus, in particular, the misalignment between the working surface on which the fastening force acts and the contact surfaces of the optical components is augmented.

Secondly, the fixing disk has a spherical outer peripheral surface, so that the fixing disk is moved to the center of the holding ring in the radial direction thereof by the fastening force acting thereon as it is fixed by means of the holding ring. Thus, the fitted optical components are subjected to a stress which moves along the contact surfaces as the fixing disk moves. At this point of time, the fastening force working surface and the contact surfaces of the optical components are not in alignment. Accordingly, the optical components cannot easily slide along the contact surfaces of each other, so that they are positioned with respect to each other without removing a distortion attributable to friction. In consequence, misalignment is caused between the respective optical axes of the optical components, so that the performance of the assembled optical module is lowered.

Thirdly, that portion of the fixing disk which is fixed by means of the holding ring and the position in which the contact surfaces of the two optical components are fitted to each other are biased in the lifting direction of the up-and-down stage. Accordingly, the welding apparatus has a great vertical dimension, which constitutes a hindrance to the miniaturization of the apparatus.

SUMMARY OF THE INVENTION

An object of the present invention is to provide an optical component welding apparatus free of misalignment between the working surface of a fixing disk on which the fastening force of a holding ring acts and contact surfaces of optical components.

Another object of the invention is to provide an optical component welding apparatus in which optical components are subject to no distortion, and misalignment between the respective optical axes of the components, which is caused during welding operation, is limited.

Still another object of the invention is to provide an optical component welding apparatus capable of reduction in size.

In order to achieve the above objects, according to the present invention, there is provided an optical component welding apparatus in which first and second optical components each having an optical axis and a contact surface are fitted to each other on the contact surfaces thereof, the respective optical axes of the components are aligned with each other by being adjusted in X-, Y- and Z-axis directions which are perpendicular to one another, and the components are then welded together. The apparatus comprises an X—Y stage for fixing the first optical component and aligning the optical axis of the first optical component in an X—Y direction; a fixing disk having a spherical outer peripheral surface and having therein a plurality of apertures extending radially and intersecting one another at the center with respect to the radial direction, the disk including fixing means for fixing the second optical component in the center of the disk with respect to the axial and radial directions thereof in a manner such that the contact surface of the second optical component faces that of the first optical component; a holding member having apertures formed in positions corresponding individually to the apertures of the fixing disk, and adapted to carry thereon the fixing disk for axial movement and releasably hold the outer periphery of the fixing disk; a Z stage for moving the holding member in the Z-axis direction, thereby fitting the respective contact surfaces of the first and second optical components to each other; and laser emitting heads for welding the first and second optical components together, on the respective contact surfaces thereof fitted to each other in the center of the fixing disk, with the optical axes thereof in alignment with each other.

In the optical component welding apparatus, the respective contact surfaces of the first and second optical components, fitted to each other, are substantially in alignment with a working surface on which acts the holding stress of the holding member for releasably holding the outer periphery of the fixing disk.

In the welding apparatus arranged in this manner, the contact surfaces of the first and second optical components are fitted to each other in the fixing disk, and the two optical components are welded together by means of laser beams transmitted through the corresponding apertures of the fixing disk and the holding member.

According to the optical component welding apparatus of the present invention, the respective contact surfaces of the first and second optical components, fitted to each other, are substantially in alignment with the working surface on which the holding stress of the holding member for releasably holding the outer periphery of the fixing disk, acts so that a high-performance optical module can be assembled without any misalignment between the working surface of the fixing disk on which the fastening force of the holding member acts and the contact surfaces of the optical components. Thus, the apparatus can be reduced in size.

The above and other objects, features, and advantages of the invention will be more apparent from the ensuing detailed description taken in connection with the accompanying drawings.

DETAILED DESCRIPTION

Referring now to FIGS. 1 to 5, one embodiment of the present invention will be described in detail.

Figure 1:
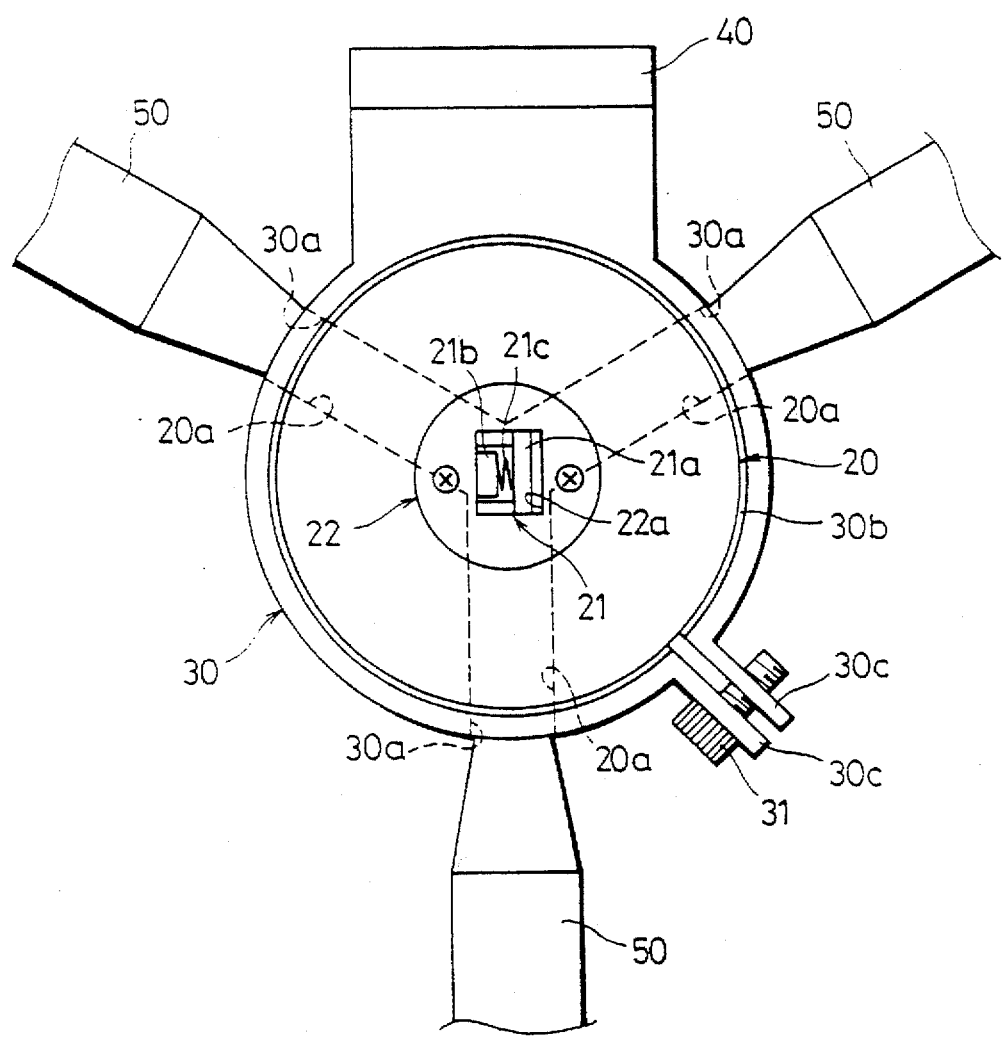
FIG. 1 is a plan view of an optical component welding apparatus according to the present invention.
Figure 2:
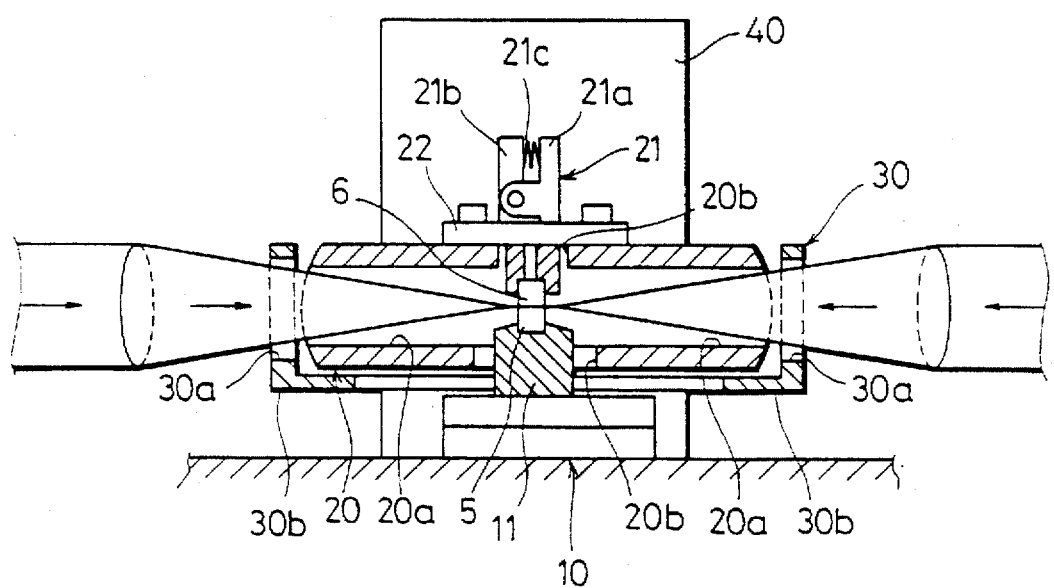
FIG. 2 is a front view, partially in section, showing the welding apparatus of FIG. 1.
Figure 3:
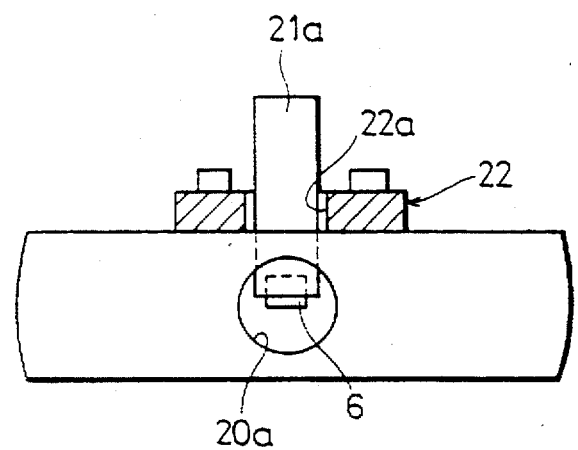
FIG. 3 is a front view of a fixing disk of the welding apparatus shown in FIG. 1.

As shown in FIGS. 1 and 2, an optical component welding apparatus (hereinafter referred to simply as "welding apparatus") 1 comprises an X—Y stage 10, fixing disk 20, holding ring 30, Z stage 40, and three emitting heads 50 for emitting laser beams. The welding apparatus 1 fits optical components, such as semiconductor lasers, lenses, optical fibers, etc., to each other without any gap between their contact surfaces, thereby aligning their respective optical axes, and fixes them together by laser welding or the like.

The X—Y stage 10 is provided with a carriage 11 which carries and fixes an optical component 5 thereon. The stage 10 moves the carriage 11 in an X—Y direction within a horizontal plane, and aligns the respective optical axes (not shown) of the optical component 5 and another optical component 6 (mentioned later) in the X—Y direction. The X—Y stage 10 is located so that the component 5 on the carriage 11 is situated substantially in the center of a through hole 20b (mentioned later) in the fixing disk 20.

The fixing disk 20 is a disk having a spherical outer peripheral surface, and includes a clamp 21. The disk 20 is formed with three radial apertures 20a. The vertically extending through hole 20b is formed corresponding to the point of intersection of the three apertures 20a.

The clamp 21 brings the respective contact surfaces (not shown) of the optical components 5 and 6 into contact with each other, thereby fixing the component 6 in the center of the fixing disk 20 with respect to the axial and radial directions thereof. The clamp 21 is removably fitted in a fitting hole 22a in the center of a mounting plate 22 which is mounted on top of the fixing disk 20. The clamp 21 includes holding arms 21a and 21b, which are connected in the middle and whose distal ends are passed through the through hole 20b. A push spring 21c is interposed between the respective distal ends of the arms 21a and 21b. The clamp 21 locates the optical component 6, held between the distal ends of the holding arms 21a and 21b, substantially in the center with respect to the vertical direction.

The holding ring 30 is a member in the form of a C-ring, as viewed from above, which carries the fixing disk 20 thereon for movement in the axial or vertical direction, and releasably holds the outer periphery of the disk 20. The ring 30 is formed with apertures 30a which are situated correspondingly to the three apertures 20a of the fixing disk 20, individually. The holding ring 30 is formed integrally with a flange 30b which extends radially inward from the lower part thereof. A pair of fastening brackets 30c protrude radially outward from the opposite end portions of the ring 30, individually, so as to face each other, and are threadedly fitted with a fastening screw 31.

Thus, in the welding apparatus 1 of the present invention, the respective contact surfaces of the optical components 5 and 6 are substantially in alignment with a working surface on which the holding stress of the holding ring 30 for releasably holding the outer periphery of the fixing disk 20, acts as seen from FIG. 2.

The Z stage 40 moves the holding ring 30 in the Z-axis direction or vertical direction, which is perpendicular to an X—Y plane defined by the X—Y stage 10, thereby fitting the respective contact surfaces of the optical components 5 and 6 to each other. The Z stage 40 is provided with a microscrew (not shown) for fine adjustment of the vertical position of the holding ring 30.

The three emitting head 50 are arranged radially around the center of the through hole 20b of the fixing disk 20 at substantially equal central angles from one another. Laser beams, e.g., YAG laser beams, emitted individually from the emitting heads 50 focus on the circumferences of the contact surfaces which touch each other substantially in the center of the through hole 20b, thereby welding the optical components 5 and 6 together.

The welding apparatus 1, having the construction described above, welds the optical components 5 and 6 in the following manner.

First, the optical component 5 is placed and fixed on the carriage 11 with its contact surface upward, and the clamp 21, fixedly holding the optical component 6 with its contact surface downward, is fitted into the fitting hole 22a of the mounting plate 22.

Thereupon, the clamp 21 is passed through the through hole 20b of the fixing disk 20, and the contact surface of the optical component 6, which is held between the respective distal ends of the holding arms 21a and 21b, and that of the optical component 5 are fitted to each other substantially in the center of the through hole 20b with respect to the vertical direction, as shown in FIG. 2.

Then, the fastening brackets 30c are closed by means of the fastening screw 31, thereby causing the holding ring 30 to hold the spherical outer peripheral surface of the fixing disk 20. At this time, the disk 20 may be dislocated with respect to the contact surfaces of the optical components 5 and 6, depending on the variability of the machining accuracy of the components 5 and 6 and the conditions in which the components 5 and 6 are attached to the welding apparatus 1.

In such a case, the fixing disk 20, along with the clamp 21, is slightly lifted as the respective contact surfaces of the optical components 5 and 6 are fitted to each other, and the disk 20 is fastened to the holding ring 30 with its surface inclined at an angle to the horizontal plane.

As mentioned hereinabove, however, the respective contact surfaces of the optical components 5 and 6 are substantially in alignment with the working surface on which the holding stress of the holding ring 30 for releasably holding the outer periphery of the fixing disk 20 acts. Accordingly, misalignment between the contact surfaces of the components 5 and 6 can be restrained. Since the contact surface of the component 6 slides along that of the component 5, moreover, the two contact surfaces can be fitted with ease.

Subsequently, the Z stage 40 is operated to raise the holding ring 30 together with the fixing disk 20 for several micrometers, whereupon a narrow gap is formed between the respective contact surfaces of the optical components 5 and 6. Thereafter, the optical axis of the component 5 is aligned with that of the component 5 by means of the X—Y stage 10.

After the optical axis alignment in the X—Y direction is finished, the Z stage 40 is operated again to lower the holding ring 30 by a margin corresponding to the aforesaid rise, thereby causing the contact surfaces to abut against each other. Then, the YAG laser beams are emitted individually from the emitting heads 50, whereby the optical components 5 and 6 are welded on the circumferences of their fitted contact surfaces.

At this time, the holding ring 30 is lowered to butt the contact surfaces of the optical components 5 and 6. Thereafter, the fixing disk 20 may be released from the hold by the ring 30 so that the components 5 and 6 can be welded together.

When the fixing disk 20 is thus released from the hold by the holding ring 30, the optical component 6 is allowed simply to rest on the optical component 5, as seen from FIG. 2. Accordingly, the optical components 5 and 6 are not subjected to any other stress, and hence, are not distorted. Thus, the components 5 and 6 can be welded with high reliability, so that the reliability of an assembled optical module is improved.

In the welding apparatus 1, furthermore, the respective contact surfaces of the optical components 5 and 6 are substantially in alignment with the working surface on which the holding stress of the holding ring 30 for releasably holding the outer periphery of the fixing disk 20 acts. Accordingly, the vertical dimension of the apparatus 1 is limited, that is, the apparatus 1 is small-sized.

Although the holding ring 30 is used as a holding member for holding the fixing disk 20 according to the embodiment described above, it is to be understood that the present invention is not limited to this embodiment.

Figure 4:
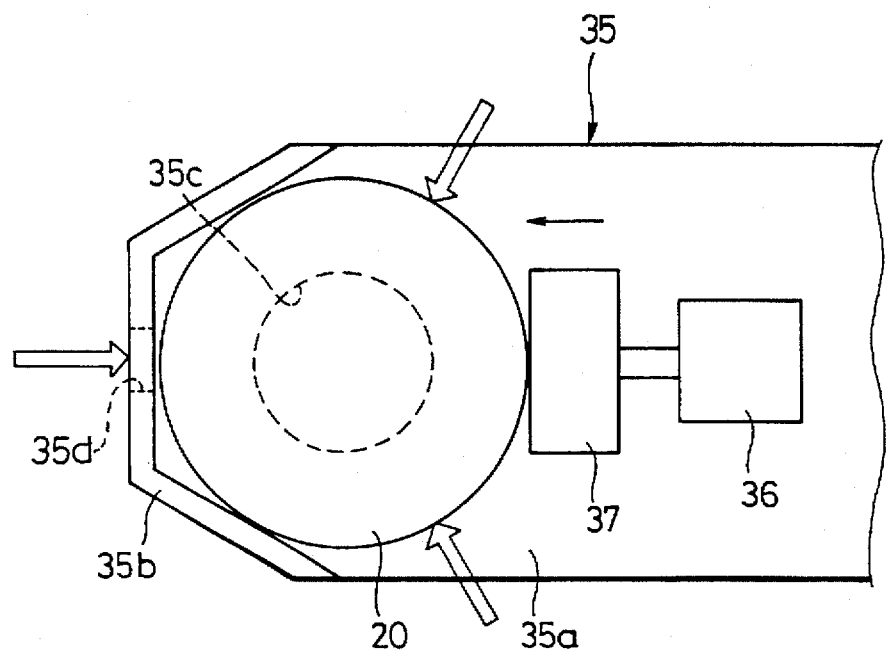
FIG. 4 is a plan view showing a modification of a holding member used in the optical component welding apparatus according to the invention.
Figure 5:
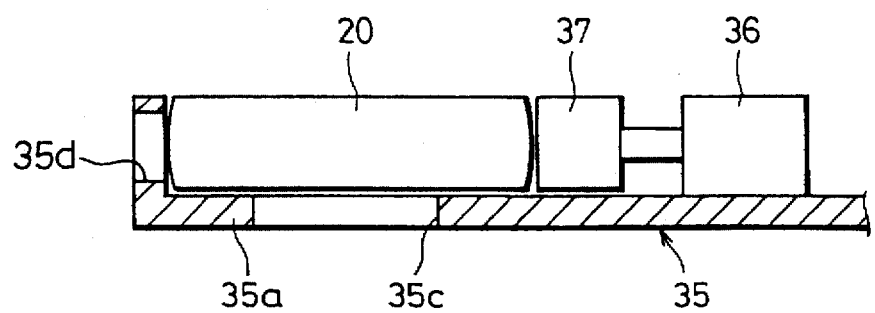
FIG. 5 is a front view, partially in section, showing the holding member.

In a holding member 35 as a modification shown in FIGS. 4 and 5, for example, a side wall 35b having a trapezoidal plane shape is provided on one side of a base 35a, which is formed with an opening 35c through which the optical components 5 and 6 are fitted to each other. Side wall 35b also has an aperture or open portion 35d therein. Also, a plane block 37 is driven by means of an air cylinder 36, which is mounted on the base 35a, so that the fixing disk 20 is held between the side wall 35b and the block 37.

What is claimed is:

1. An optical component welding apparatus for welding together first and second optical components each having an optical axis in a Z-axis direction and each having a contact surface, the optical component welding apparatus comprising:

an X—Y stage for fixing the first optical component and aligning the optical axis of the first optical component by moving the first optical component in an X-axis and Y-axis direction;

a fixing disk having a plurality of apertures extending radially of the fixing disk and intersecting one another at a center of the fixing disk with respect to the radial direction, the fixing disk including fixing means for fixing the second optical component in the center of the fixing disk with respect to the axial and radial directions thereof in a manner such that the contact surface of the second optical component faces the contact surface of the first optical component;

a holding member having a plurality of apertures each formed in a position respectively corresponding to a position of one of the plurality of apertures of the fixing disk, the holding member releasably holding the fixing disk and being adapted to carry the fixing disk for axial movement of the fixing disk in a Z-axis direction and for inclined movement of the fixing disk in an inclination direction relative to an X—Y plane;

a Z stage for moving the holding member in the Z-axis direction to fit the respective contact surfaces of the first and second optical components to each other; and laser emitting heads for emitting a laser beam through corresponding apertures of the fixing disk and holding member to weld the first and second optical components together at the respective fitted contact surfaces thereof, with the optical axes of the first and second optical components in alignment with each other.

2. The optical component welding apparatus of claim 1, wherein the fixing disk has a spherical outer peripheral surface for inclined moving of the fixing disk in the inclined direction to fit the respective contact surfaces of the first and second optical components to each other.

3. The optical component welding apparatus of claim 2, wherein the holding member has a C-ring shape and releasably holds the fixing disk along the spherical outer peripheral surface thereof.

4. The optical component welding apparatus of claim 3, wherein the fixing disk includes a through hole axially extending at the point of intersection of the plurality of apertures radially extending therein, and the fixing means of the fixing disk comprises a clamp for fixing the second optical component in the center of the through hole with respect to the axial direction.

5. The optical component welding apparatus of claim 4, wherein the holding member releasably holds the fixing disk such that the respective contact surfaces of the first and second optical surfaces are substantially in alignment with a working surface on which the holding stress of the holding member releasably holding the fixing disk acts.

6. The optical component welding apparatus of claim 5, wherein the fixing disk and holding member each include three respectively corresponding radial apertures.

7. The optical component welding apparatus of claim 4, wherein the X—Y stage includes a carriage for fixing the first optical component substantially in alignment with the through hole of the fixing disk.

8. The optical component welding apparatus of claim 7, wherein the laser emitting heads emit laser beams which focus on the circumferences of the respective contact surfaces of the first and second optical components, the respective contact surfaces of the first and second components being fitted to each other substantially in the center of the through hole of the fixing disk.

9. The optical component welding apparatus of claim 1, wherein the X—Y stage includes a carriage for fixing the first optical component substantially in alignment with the center of the fixing disk.

10. The optical component welding apparatus of claim 1, wherein the holding member comprises a base member having an opening therein through which the first and second optical components are fitted to each other, a trapezoidal plane shape member on one side of the base member, and a plane block mounted on the base for holding the fixing disk up against the trapezoidal plane shaped member.

11. An optical component welding apparatus for welding together first and second optical components each having an optical axis in a Z-axis direction and each having a contact surface, the optical component welding apparatus comprising:

an X—Y stage for fixing the first optical component and aligning the optical axis of the first optical component by moving the first optical component in an X-axis and Y-axis direction;

a fixing disk having a plurality of apertures extending radially of the fixing disk and intersecting one another at a center of the fixing disk with respect to the radial direction, the fixing disk including fixing means for fixing the second optical component in the center of the fixing disk with respect to the axial and radial directions thereof in a manner such that the contact surface of the second optical component faces the is contact surface of the first optical component;

a holding member having a plurality of open portions each formed in a position respectively corresponding to a position of one of the plurality of apertures of the fixing disk, the holding member releasably holding the fixing disk and being adapted to carry the fixing disk for axial movement of the fixing disk in a Z-axis direction and for inclined movement of the fixing disk in an inclination direction relative to an X—Y plane;

a Z stage for moving the holding member in the Z-axis direction to fit the respective contact surfaces of the first and second optical components to each other; and laser emitting heads for emitting a laser beam through apertures of the fixing disk and through open portions of the holding member to weld the first and second optical components together at the respective fitted contact surfaces thereof, with the optical axes of the first and second optical components in alignment with each other.

12. The optical component welding apparatus of claim 11, wherein the holding member comprises a base member having an opening therein through which the first and second optical components are fitted to each other, a trapezoidal plane shape member on one side of the base member, and a plane block mounted on the base for holding the fixing disk up against the trapezoidal plane shaped member.

* * * * *